Patented Apr. 13, 1954

2,675,315

UNITED STATES PATENT OFFICE 2,675,315

PHOTOSENSITIVE COATING CONTAINING A HYDROPHILIC COLLOID AND A POLYVINYL CHLORIDE DISPERSION

Henry C. Staehle and Lawrence E. Martinson, Rochester, N. Y., assignors to Eastman Kodak Company, Rochester, N. Y., a corporation of New Jersey No Drawing. Application December 13, 1949,
Serial No. 132,795

5 Claims. (Cl. 95—7)

This invention relates to the preparation of photographic resist materials and to methods of forming images therein.

In Staehle U. S. patent application Serial No. 558,346, filed October 12, 1944, now abandoned, of which U. S. Patent 2,604,388 is a continuation-in-part, a light-sensitive material is described which may be used as a photosensitive resist. The material consists of a bichromated hydrophilic colloid such as gelatin or glue containing an aqueous colloidal dispersion of a soft, synthetic resin which dries to a continuous film when the aqueous dispersion alone is coated on glass. The sensitive material may contain a pigment such as titanium oxide and with or without the pigment when coated on a support and processed to form a photographic relief image, it may be used as a resist for etching with a light sand blast or with acid or alkali or electrolytically.

We have found that a satisfactory resist material, particularly for etching, may be prepared by replacing the dispersion of soft, synthetic resin of the sensitive material described in Patent 2,604,388, with either saran latex or an aqueous colloidal dispersion of polyvinyl chloride-polyvinyl acetate copolymer or by adding either the saran latex or dispersion of polyvinyl chloride-polyvinyl acetate copolymer to the sensitive material containing the dispersion of soft, synthetic resin. The sensitive material thus produced may be processed in the manner described in Patent 2,604,388 to form a relief image; the image after processing is extremely resistant to acids and alkalis and is especially suitable for use as an etching resist. Saran latex is a dispersion in water of polyvinylidine chloride and about 20% of the weight of polyvinylidine chloride of dibutyl phthalate as a plasticizer. Material of this type is described in U. S. Patents 2,333,633–4–5.

The resist materials of our invention may be applied to supports of glass, synthetic resin, cellulose ester, steel, aluminum, etc., but are particularly useful for application to anodized aluminum, to which very few photographic sensitive resists may be satisfactorily applied. Our composition adheres well to any clean surface although in some cases it may be desirable to coat the support with a primer before application of the resist materials. Primers which may be used include turpentine, cumarone resins, alkyd resins, plasticized cellulose nitrate, oxidized drying oils, chlorinated rubber, etc.

The sensitive materials of our invention are made by mixing either saran latex or the dispersion of polyvinyl chloride-polyvinyl acetate copolymer with a hydrophilic colloid such as gelatin or glue and sensitizing the mixture with a bichromate such as ammonium bichromate. The saran latex or dispersion of polyvinyl chloride-polyvinyl acetate copolymer may be used alone in the sensitive composition or used together with an aqueous dispersion of a soft, synthetic resin such as polymethyl acrylate or polyethyl acrylate or mixture of these resins. When used either alone or in admixture with a dispersion of the acrylate resin, the sensitive material containing the saran latex produces a light sensitive composition which may be coated on the supports mentioned above, exposed to an object or image and developed by washing with water. The exposed portions of the coating wash away thus producing a direct positive image.

Our invention will be illustrated by reference to the following examples.

Example 1

A sensitive composition was made by adding 10 grams of gelatin dissolved in 20 cc. of water to 40 cc. of saran latex diluted with 20 cc. of water and then adding 5 cc. of 20% ammonium bichromate solution and 10 cc. of a 5% solution of

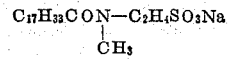

as a wetting or spreading agent. The gelatin used in the composition was a lime-process gelatin highly hydrolyzed during manufacture. This gelatin has a low viscosity and is referred to as "low grade gelatin." The saran latex used in the composition had a solids content of about 55%.

Example 2

A sensitive composition containing both saran latex and an aqueous dispersion of polymethyl acrylate or polyethyl acrylate resin was made by mixing in order the following solutions.

A. Gelatin _____ grams__ 180
   Water _____ cc__ 690
   Sodium phosphate _____ grams__ 10
B. Polymethyl acrylate or polyethyl acrylate
   dispersion _____ cc__ 490
   Saran latex _____ cc__ 400
C. Water _____ cc__ 130
   Potassium chromate _____ grams__ 24
   Ammonium bichromate (20% solution)
   _____ cc__ 35
   $NaHPO_4 \cdot 7H_2O$ _____ grams__ 5
   Ammonium acetate _____ grams__ 40

This composition when coated in the usual manner was exposed under an image and processed with water and then heated to 130° C. to heat seal the resin. It was successfully used as an etching resist.

*Example 3*

A sensitive composition was made by mixing in order the following solutions:

A. Gelatin _____ grams__ 120
   Water _____ cc__ 400
B. Water _____ cc__ 400
   Ethyl Cellosolve _____ cc__ 20
   Saran latex _____ cc__ 500
C. Water _____ cc__ 250

$$C_{11}H_{23}CON-C_2H_4SO_3Na$$
$$\quad\quad\quad\;|$$
$$\quad\quad\;\;CH_3$$ _____ grams__ 10

Ammonium nitrate _____ grams__ 10
Ammonium hydroxide (28% solution)
                                  cc__ 15
Ammonium bichromate (20% solution)
                                  cc__ 40

*Example 4*

A sensitive composition was made by adding the following solution A to solution B, and then adding C to AB:

A. Gelatin _____ grams__ 250
   Water _____ cc__ 880
   Ammonium bichromate (20% solution) _____ cc__ 150
B. Water _____ cc__ 500
   Triton 720 (sodium salt of alkylated aryl polyether sulfonate) _____ cc__ 40
   Geon 31–X (dispersion of polyvinyl chloride-polyvinyl acetate copolymer) _____ cc__ 300
   Polymethyl acrylate or polyethyl acrylate dispersion _____ cc__ 260
   Natural rubber latex _____ cc__ 50
C. Water _____ cc__ 200
   Sodium sulfate _____ grams__ 25
   Triton 720 _____ cc__ 10
   Hydroxy ethyl cellulose _____ cc__ 125

The composition was coated in the usual manner, exposed to an image, processed with water, and heated to about 120° C. for 5 minutes to set the resin. It was used successfully as an etching resist.

As in the case of the sensitive material of U. S. Patent 2,604,388, the resist composition of the present invention may be handled in ordinary room light for a reasonable length of time without fog. The material as described in Example 2 when coated on a suitable support will produce an image of satisfactory density and contrast when exposed to a 150-watt mercury vapor lamp for 15 seconds at a distance of about 10 inches. Exposure to ordinary direct sunlight for about the same length of time will also produce a satisfactory image.

Development is carried out by immersing in, or spraying the exposed material with, water. In most cases, water alone is satisfactory although it may be desirable to add a hardening agent such as alum, a swelling agent such as ammonium hydroxide or an acid or solvent to the water. After exposure, development and drying the images produced according to our invention are light-stable and resistant to ordinary handling. They may be removed from the support by the use of abrasives or solvents but do not peel readily once they have become dry.

The sensitive material of our invention contains approximately two parts of resin to one part of gelatin or glue and since the resin has high resistance to alkalies and acids, the resulting image is extremely durable. Not only does it confer excellent protection to hydrochloric acid but the photographic image has high resolution as well. This is important in making half tone images, which is one of the uses to which our material is adapted. Half-tone images etched in anodized aluminum can be made from 300-line half-tone positives. Anodized aluminum may be satisfactorily etched with our resist material and halftone images or any plates of exceptional fine detail can be prepared easily and quickly. Another field of usefulness is in making relief printing plates inasmuch as the anodized layer of aluminum has exceptional wear resistance. A third application is in making planographic printing plates in which a very shallow etch is all that is required.

It will be understood that the examples and modifications included herein are illustrative only.

We claim:

1. A light-sensitive coating composition comprising a mixture of a bichromated gelatin, an aqueous dispersion of a resin selected from the class consisting of polyvinylidene chloride latex and polyvinyl chloride-polyvinyl acetate copolymers, the ratio of said gelatin to said aqueous dispersion being between about 1 to 2.5 and 1 to 5, said composition being adapted to produce a light-sensitive coating in which a reversal image can be formed by exposure to light and development in an aqueous solution.

2. A light-sensitive coating composition comprising a mixture of a bichromated gelatin, an aqueous dispersion of a polyvinylidene chloride latex, an aqueous colloidal dispersion of a water-insoluble, soft, acrylate resin, the ratio of said gelatin to said aqueous dispersions being between about 1 to 2.5 and 1 to 5, said composition being adapted to produce a light-sensitive coating in which a reversal image can be formed by exposure to light and development in an aqueous solution.

3. The method of making a photographic relief image suitable as an etching resist, which comprises coating a support which can be etched, with a mixture of a bichromated gelatin, and an aqueous dispersion of a polyvinylidene chloride latex, the ratio of said gelatin to said aqueous dispersion being between about 1 to 2.5 and 1 to 5, drying said coating, exposing it to an image, and washing away the exposed portions of said coating with an aqueous solution to leave said coating in the unexposed portions.

4. The method of making a photographic relief image suitable as an etching resist, which comprises coating a support which can be etched, with a mixture of a bichromated gelatin, an aqueous colloidal dispersion of a soft, acrylate resin, and an aqueous dispersion of a polyvinylidene chloride latex, the ratio of said gelatin to said aqueous dispersions being between about 1 to 2.5 and 1 to 5, drying said coating, exposing it to an image, and washing away the exposed portions of said coating with an aqueous solution to leave said coating in the unexposed portions.

5. A sensitive photographic resist material comprising an etchable support having thereon a mixture of bichromated gelatin, an aqueous dispersion of a polyvinylidene chloride latex, and an aqueous colloidal dispersion of a resin of the group consisting of polymethyl acrylate and polyethyl acrylate and mixtures thereof, the ratio of said gelatin to said aqueous dispersions being between about 1 to 2.5 and 1 to 5.

References Cited in the file of this patent

UNITED STATES PATENTS

| Number | Name | Date |
|---|---|---|
| 1,587,274 | Beebe | June 1, 1926 |
| 1,981,102 | Hagedorn et al. | Nov. 20, 1934 |
| 2,016,490 | Fikentscher | Oct. 8, 1935 |
| 2,099,297 | Clement | Nov. 16, 1937 |
| 2,500,028 | Griggs et al. | Mar. 7, 1950 |
| 2,533,530 | Staehle | Dec. 12, 1950 |

FOREIGN PATENTS

| Number | Country | Date |
|---|---|---|
| 573,771 | Great Britain | Dec. 5, 1945 |

OTHER REFERENCES

Official Digest No. 262, Nov. 1946, "Investigation of Aqueous Acrysol, Geon and Saran Dispersions," pp. 503–512.

"Vinylidene Chloride Polymer," Goggin et al., ACS meeting, March 18, 1942, Atlantic City, N. J., pp. 2 and 4 cited.